United States Patent [19]
Reff

[11] Patent Number: 5,950,017
[45] Date of Patent: *Sep. 7, 1999

[54] CAMERA SYSTEM INCLUDING A CAMERA MOUNTING APPARATUS FOR OBTAINING CLOSE-UP PHOTOGRAPHS

[76] Inventor: Albert A. Reff, 510 N. Prospect Ave. - Suite 105, Redondo Beach, Calif. 90277

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,926

[22] Filed: Oct. 21, 1997

[51] Int. Cl.$^6$ .................................................. G03B 17/24
[52] U.S. Cl. ................................ 396/14; 396/71; 396/89; 396/348; 396/419; 396/544
[58] Field of Search .................................. 396/6, 14, 17, 396/419, 544, 71, 89, 348

[56] References Cited

U.S. PATENT DOCUMENTS

| | | | |
|---|---|---|---|
| 3,687,030 | 8/1972 | Dine et al. ................................ | 396/14 |
| 3,836,927 | 9/1974 | Dine et al. ................................ | 396/14 |
| 4,755,838 | 7/1988 | Lemmey .................................... | 396/14 |
| 5,576,781 | 11/1996 | Deleeuw .................................. | 396/14 |
| 5,591,119 | 1/1997 | Adair ........................................ | 396/17 |

*Primary Examiner*—David M. Gray
*Attorney, Agent, or Firm*—Graham & James LLP

[57] ABSTRACT

A sterile, disposable camera system which is always sterilized for use and avoids the need to sterilize the camera or camera mounting system for re-usage includes a sterile camera unit which is easily, removably mounted on a sterile mounting apparatus which may be constructed to be collapsible. The camera mounting system is disposable such that after the camera system has been used, the sterile camera unit is easily removed from the sterile mounting apparatus and the mounting apparatus can be discarded as waste. The mounting apparatus is arranged to support the sterile camera unit relative to a subject to be photographed such that the camera quickly obtains in-focus close-up photographs of subjects of interest.

30 Claims, 12 Drawing Sheets

CAMERA SYSTEM INCLUDING A CAMERA MOUNTING APPARATUS FOR OBTAINING CLOSE-UP PHOTOGRAPHS

BACKGROUND OF THE INVENTION

1. Field of the Invention

The present invention relates to a camera system for obtaining close-up still or video photographs of a subject, and more particularly, a sterile, disposable camera system including a sterile camera unit and a sterile mounting apparatus which is constructed to be collapsible and disposable such that after the camera system has been used, the sterile camera unit is easily removed from the mounting apparatus and the mounting apparatus can be collapsed and discarded as waste.

2. Description of the Related Art

Prior art systems have been devised for mounting photographic cameras relative to subjects to be photographed such that accurate, in-focus close-up photographs of the subjects can be obtained. One such camera mounting system is disclosed in two patents issued to Dine et al., U.S. Pat. Nos. 3,836,927 and 3,687,030.

In these two patents, Dine teaches a camera mounting system having a camera supporting structure which is formed of metal and includes a locator arm attached to a mounting bracket which supports a close-up lens. A camera is placed on the mounting bracket and attached thereto via a screw such that the camera is located at a position which aligns the camera lens and close-up lens. The locator arm includes a picture-bracketing frame for defining a plane at the point of focus of the camera and close-up lens combination. As a result of this structural arrangement, when the picture-bracketing frame is positioned over a subject to be photographed, the subject to be photographed fills the image field of the camera and is in-focus for the close-up lens.

Although the Dine camera is constructed to function as a close-up camera to provide proper focus for photographing an object at close range, it is not suited to meet the demands of present day health care industry described below.

Physicians frequently have a need for photographic records of clinical features of a patient's condition for documenting medical procedures, for aide in diagnosing and teaching, and for malpractice risk reduction procedures requiring accurate, contemporaneous documentation of medical conditions and procedures.

For example, a dermatologist may wish to photograph skin lesions on a patient. An orthopedic surgeon may wish to obtain photographs of a knee or elbow undergoing surgery at various points during the surgery. An oral surgeon may desire photographs of a patient's teeth or gums. In each of these instances, the ability to quickly access a photographic system and place a sterile camera at the proper focal distance to reproducibly obtain an in-focus close-up of the area undergoing treatment and then quickly and easily remove the camera and discard the camera mounting system without concern for labor intensive and reliability concerns of recycling equipment is very advantageous.

More particularly, the nature of medical procedures often requires that an object placed in contact with a patient be sterilized. If a camera or camera mounting system, such as the Dine camera systems, is re-used for various patients, the camera must be reloaded with film, and the camera and the mounting system must be re-sterilized. This requires significant time and labor-intensive procedures. Thus, not only the camera, but also the camera mounting system must be thoroughly cleaned, reloaded, repackaged and re-sterilized after each use.

In addition, various medical procedures such as surgery and the time pressures associated therewith require that the camera be easily and quickly mounted onto or removed from a camera mounting apparatus and that the camera mounting apparatus occupy as little space as possible before and after use to accommodate available storage space constraints within an operating room or emergency room and to accommodate hazardous waste disposal requirements within the medical environment. The extensive sterilization procedures required for the storage, operation and processing of the Dine camera and mounting apparatus severely limits its ease of use and creates a significant possibility that the camera and/or camera mounting apparatus when needed could be non-sterile and contain bacteria or other potentially harmful material such as blood or body fluids containing various blood-borne viruses and/or that proper batteries, film and flash may not be readily available and sterile.

Furthermore, the Dine camera and mounting system were clearly not designed to be used in a sterile environment and sterilized or re-sterilized. As seen in the Figures of the Dine patents, the Dine camera and mounting system includes numerous components interconnected by many small connecting members and the surface of the Dine system includes small openings, recessed areas, small spaces between mating or interconnected parts, etc. where potentially harmful material can gather and make it extremely difficult to remove such material completely. Therefore, even if the Dine camera and mounting system were cleaned and sterilized according to known, routine sterilization procedures, the Dine camera and system might not be completely cleaned and all of the potentially harmful material might not be completely removed from the various surfaces of the Dine camera and mounting system.

In addition, the camera-attaching structure of the Dine camera mounting apparatus requires time consuming and difficult attaching operations such as securing a camera in position and rotating a screw to secure the camera to the camera mounting apparatus as well as securing a second set screw to attach the close-up lens plate to the frame.

Further, the Dine camera mounting apparatus occupies a relatively large space because it cannot be collapsed or reduced in size in any way.

Further, the Dine system requires attention to insure that batteries, flash cubes and fresh film are sterilized and available for use and then requires one or more of a battery check and/or replacement operation, a film loading operation and a flash-cube attachment operation. If the components of the Dine system were cleaned, sterilized and re-sterilized, these processes would likely lead to corrosion of electrical contacts and mechanical breakdown over time which would result in a lack of reliability of the Dine system.

Thus, the inability of prior art camera systems to be cleaned and sterilized easily and completely without damaging the system components, to be used quickly and safely in the operating room or hospital environment, to achieve compact and sterile storage have severely limited the applicability and usefulness of the prior art devices.

SUMMARY OF THE INVENTION

To overcome the problems described above, the preferred embodiments of the present invention provide a sterile, disposable camera system which is always sterilized for use and avoids the need to clean or re-sterilize or reload the camera or clean and re-sterilize the camera mounting system for re-usage and avoids the problems associated with electrical and mechanical failure of components occurring in recycled devices.

The preferred embodiments of the present invention also provide a sterile and disposable camera system which is extremely easy to use and store and does not require sterilization, maintenance, film loading, flash cubes, batteries or storage after use.

Further, the preferred embodiments of the present invention provide a sterile, disposable camera system in which a camera is easily, removably mounted on a mounting apparatus which is constructed to be disposable such that after the camera system has been used, the camera is easily removed from the mounting apparatus and the mounting apparatus can be collapsed and discarded as waste. A new, sterile camera mounting system including a camera mounting apparatus and a pre-loaded film camera can be used for each new patient thereby eliminating the need to sterilize, store and maintain the camera mounting system.

In the case of a need for use of a non-disposable digital still camera or video camera, another preferred embodiment of the present invention can be used. This other preferred embodiment of the present invention includes a prepackaged, sterilized and disposable camera mounting apparatus which is adapted to releasably receive and reliably support a sterilized digital still camera or video camera.

In another preferred embodiment, the sterile camera mounting apparatus is constructed to be capable of being collapsed during storage and easily expandable into a full size when used. After use, the camera mounting apparatus can again be collapsed and discarded as waste to minimize storage space requirements and refuse space occupancy.

The camera mounting system according to the preferred embodiments of the present invention includes a unique structure which is sterilized and disposable while allowing a camera to be quickly and easily mounted on a camera mounting apparatus such that the camera quickly obtains in-focus close-up photographs of subjects of interest at predetermined desired distances and fields of view depending on the choice of the dimensions of the structure and corresponding close-up lens incorporated in the structure.

The camera mounting apparatus of the preferred embodiments of the camera mounting system is preferably made of a light-weight, disposable material which is easy to store before use and is easily discarded after use and complies with OSHA hazardous waste management requirements. More particularly, the camera mounting apparatus may preferably be stored in a folded or collapsed arrangement before use to occupy minimal space and then, the camera mounting apparatus can be unfolded quickly and easily for use. After use, the camera mounting apparatus can again be collapsed and folded to be discarded while occupying minimal space and avoiding the contamination of present and future sterile environments.

To facilitate the ease of use of the camera mounting system of the preferred embodiments of the present invention, the camera mounting system preferably includes a camera holding mechanism which allows a camera to be attached via a snap-on attaching structure on the mounting apparatus.

According to the preferred embodiments of the present invention, a camera system comprises a photographic camera in a sterile camera unit and a sterile camera mounting apparatus which releasably receives the camera. The camera can be of any suitable type including a disposable film camera, a digital still camera, a video camera, etc.

The camera mounting apparatus preferably includes a camera mounting structure for supporting the camera and a frame for locating the camera at a desired distance from the subject. A close-up photographic lens in the camera mounting structure aligns with the lens on the camera when the camera is received by the camera mounting apparatus. In one preferred embodiment of the present invention, the camera mounting structure contains a mounting plate surrounded by a series of mounting members in the form of snap-tabs and guide tabs arranged to define a receiving space into which the body of the camera is inserted. In another preferred embodiment of the present invention, the camera mounting apparatus contains a mounting plate supporting a mounting member shaped to define a receiving space into which the raised rim around the camera lens is inserted and secured with an iris closure or attachment similar to a quick-disconnect bayonet mount.

The frame preferably includes a base and structural support members secured to the mounting plate of the camera mounting structure. The dimensions of the structural support members joining the base to the mounting plate are preferably selected such that the base lies at a distance equal to the point of focus of the combined close-up lens and camera lens. The dimensions of the base are selected such that the interior of the base borders the image field of the film in the camera. In this manner, the sterile camera unit can be easily releasably secured to the mounting plate, the base of the frame placed on or over the subject to be photographed and the film in the camera exposed to provide in-focus close-up photographic images of the subject accurately framed by the base.

The camera mounting apparatus including the frame, the camera mounting structure and mounting plate are preferably sterilized as described below. According to a preferred embodiment of the present invention, the camera and frame are preferably sterilized after being provided in a double-wrap packaging. More particularly, the camera, preferably a disposable camera, is wrapped in a shrink wrap material which preferably remains on the camera even during use. Then, the camera and the frame may be provided in a container, such as a box. The box is preferably double-wrapped in a material such as paper or other suitable material that is gas permeable. Then, the double-wrapped container having the camera and frame disposed therein are sterilized via a suitable sterilization processes or methods such as using ethylene oxide or other suitable material or gases. The entire sterile apparatus is preferably stored and shipped in this sterile double-wrapped packaging.

In an alternative embodiment where a camera other than a disposable camera is used, the disposable frame can be provided in one sterile packaging and the camera can be provided in another sterile packaging, having been re-processed for each procedure.

The structural support members of the frame are preferably manufactured of a lightweight plastic material or other suitable lightweight material which, depending upon the embodiment, may be collapsed to allow for easy and minimal storage before use and easy and quick disposal after use. The structural support members may preferably be arranged so as to be easily changed from the folded position to an unfolded position where the structural support members are locked into a full, open position in which the camera is supported and positioned at the required distance from the subject.

As a result of the structure and material of the camera system of the preferred embodiments of the present invention, medical personnel are increasingly protected because of the reduced handling requirements of the disposable system, no cleaning, sterilization or major assembly of a camera or camera mounting structure is required, space and storage requirements are significantly reduced and ease of use is tremendously increased. In addition, the cost and time required for cleaning, sterilizing, re-sterilizing and overall recycling of the system components are avoided. Furthermore, the inevitable deterioration of mechanical parts and corrosion of electrical parts caused by re-cleaning and re-sterilizing is no longer a problem.

These and other elements, features, and advantages of the preferred embodiments of the present invention will be apparent from the following detailed description of the preferred embodiments of the present invention, as illustrated in the accompanying drawings, wherein like reference numerals are used to indicate like elements to avoid repetition.

DETAILED DESCRIPTION OF PREFERRED EMBODIMENTS

Figure 1A:
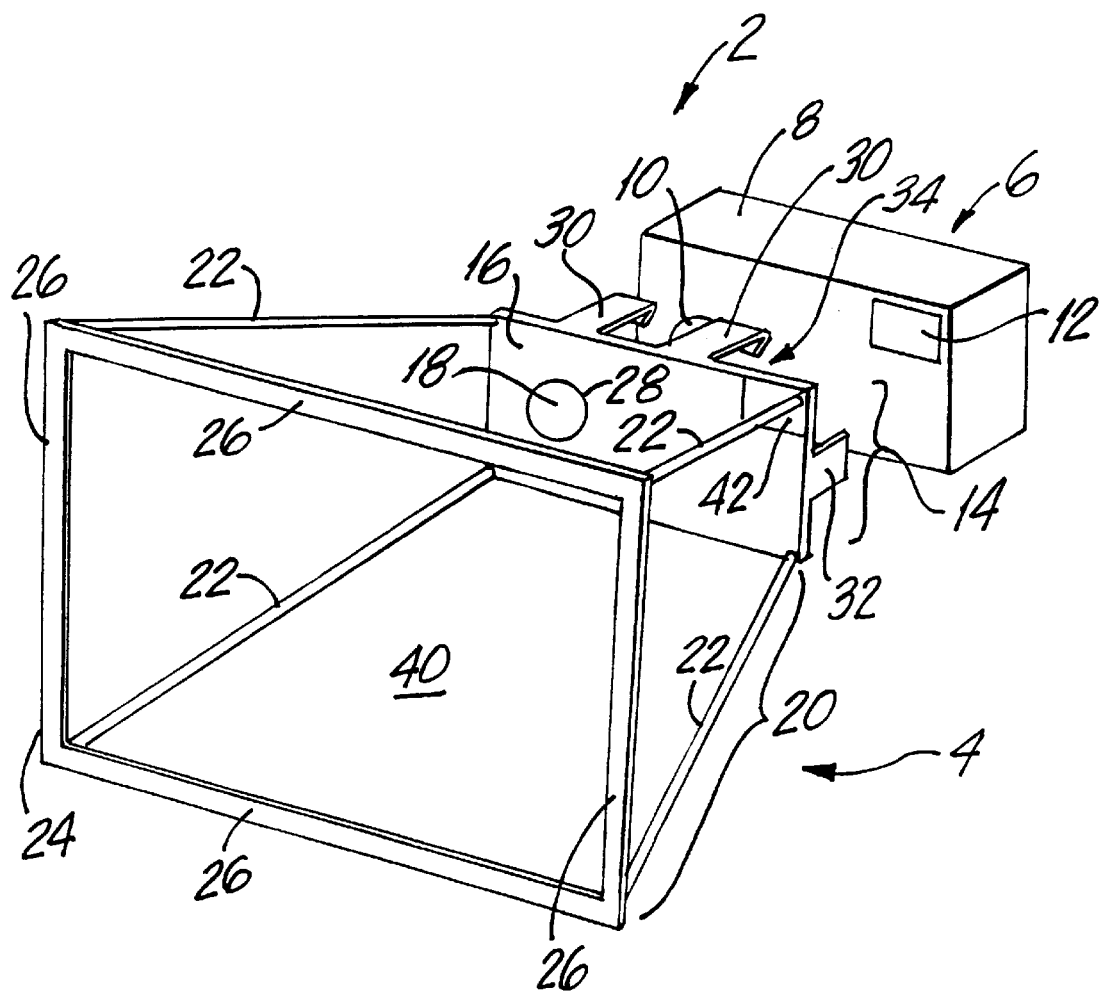
FIG. 1A is a perspective view of a preferred embodiment of the camera system of the present invention.

A camera system according to preferred embodiments of the present invention, including the camera and the camera mounting apparatus, can be seen in perspective in FIG. 1A. FIGS. 2–5 respectively illustrate the front, right side, top and rear views of the camera mounting apparatus of the camera system shown in FIG. 1A.

In the first preferred embodiment shown in FIG. 1A, a camera system 2 is preferably constructed to be disposable and sterile. The camera system in FIG. 1A preferably includes a camera mounting apparatus 4 including a structure for quickly, easily and releasably receiving and holding a camera 6 which will be described in more detail below.

Camera 6 includes a camera body 8 containing a camera lens 10 and flash 12. Camera 6 may be of any type including a disposable camera, a video camera, a digital camera, etc. In a preferred embodiment in which disposability is desired, camera 6 is preferably a disposable camera.

The camera mounting apparatus 4 includes a camera mounting structure 14 preferably including a mounting plate 16 containing a close-up lens 18. Close-up lens 18 is positioned in mounting plate 16 at a location corresponding to a location of camera lens 10 of camera 6 when the camera 6 is mounted in the camera mounting apparatus 4.

Camera mounting apparatus 4 also includes a frame 20 which supports the camera mounting plate 16. Frame 20 preferably includes structural support members 22 extending from the mounting plate 16 to a base 24 comprising a plurality of base members 26. The frame 20 is preferably formed of a lightweight, sturdy plastic or other suitable material which is inexpensive and easily disposable. However, in the preferred embodiment shown in FIG. 1A, the frame 20 is not collapsible.

In other preferred embodiments shown in FIGS. 1B–1G, the frame 20 preferably includes a collapsible structure in which the support members 22 are collapsible so that the overall size of the frame 20 can be substantially reduced and preferably the base 24 can be brought into close proximity to the mounting plate 16. The collapsibility of the frame 20 may be achieved in many different ways as shown in the various preferred embodiments illustrated in FIGS. 1B–1G.

Figure 1B:
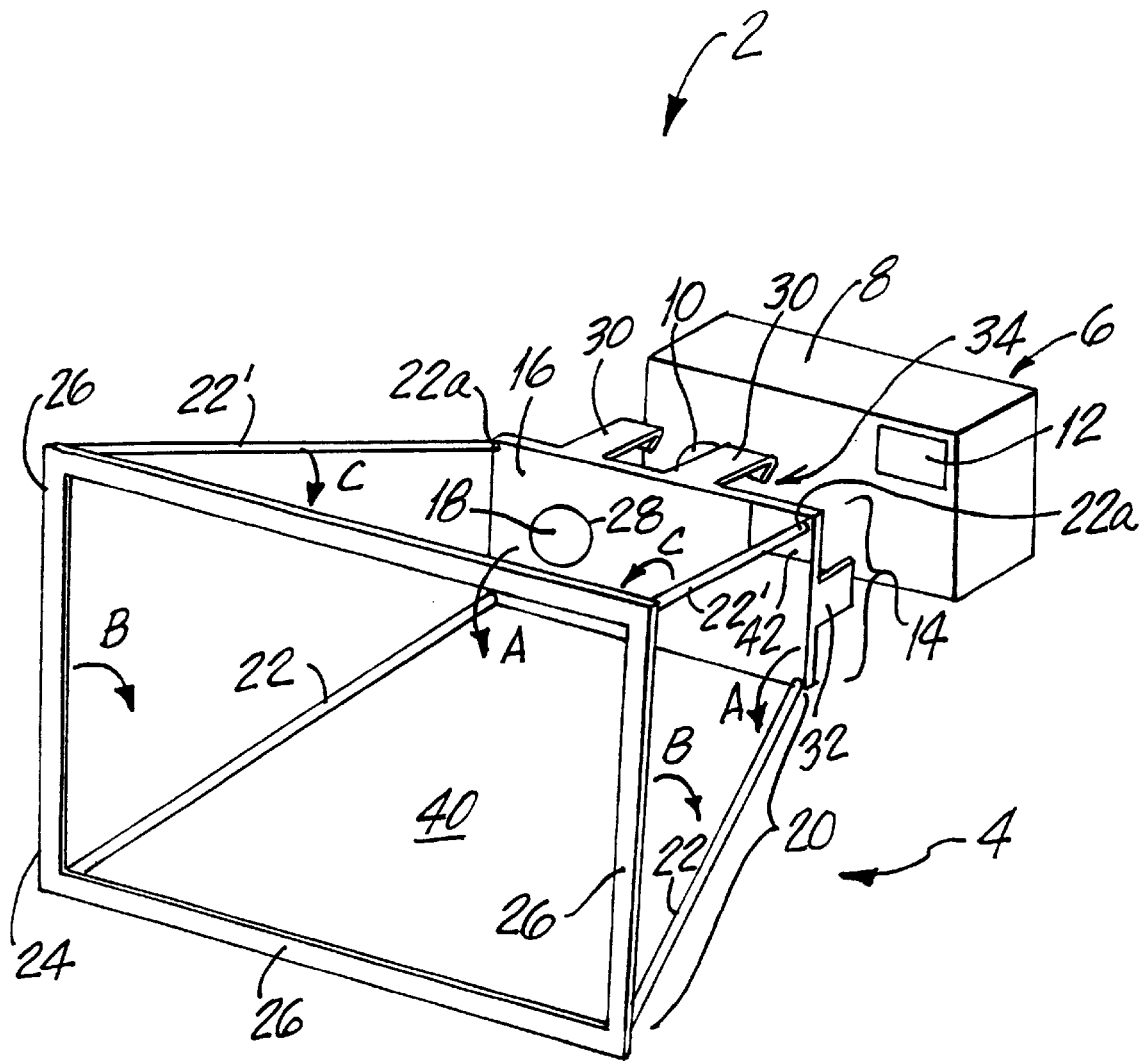
FIGS. 1B–1G show various examples of structural embodiments for providing a collapsible structure of the frame of the camera system of FIG. 1A.

According to FIG. 1B, the two top support members labeled as 22' in FIG. 1B can be removably disposed in holes 22a formed in the mounting plate 30 and the ends of the support members 22' opposite to the ends 22a can be hingedly connected to the upper base member 26. Once the two top support members 22' have been removed from the holes 22a, the support members 22' may be moved and rotated via the hinged connected in a direction of arrow C to rest against the upper base member 26 of the base 24. Alternatively, holes 22a may also be provided in the upper base member 26 of the base 24 such that the two upper support members 22' can be removed completely from the frame 20.

As a result of moving or removing the two upper support members 22', the mounting plate 16 may be moved in the direction of arrow A and the base 24 may be moved in direction of arrow B to form a substantially flat unit which is suitable for storage or disposal.

Figure 1C:
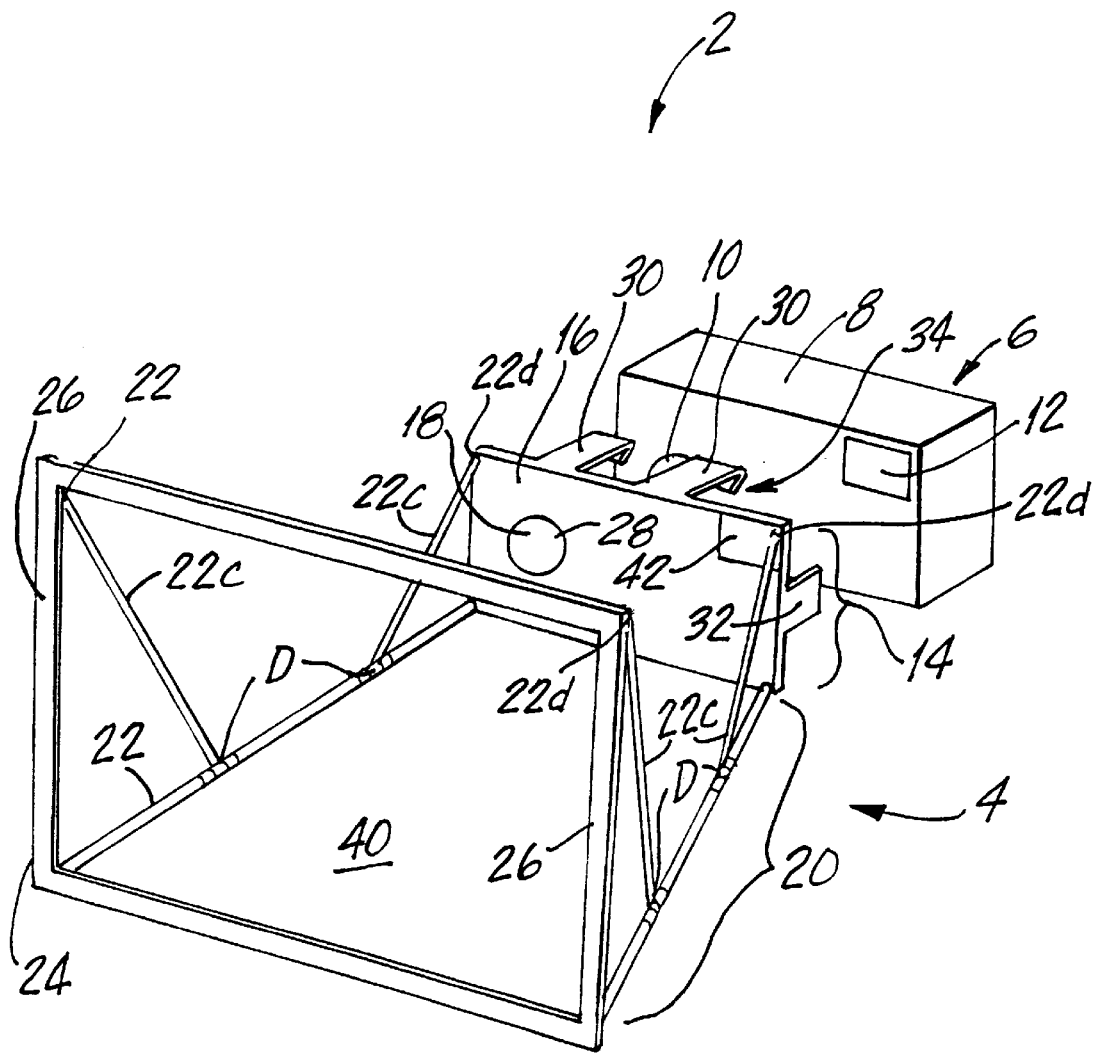

As seen in FIG. 1C, an alternative structure for allowing the frame 20 to be collapsible is provided. The two upper support members 22' of the preferred embodiment shown in FIG. 1B are replaced in FIG. 1C by a plurality of support members 22c which are hingedly connected to the mounting plate 16 and base member 26 and disposed within one of a plurality of detents D disposed on the two lower support members 20.

When the lower ends of the support members 22c are removed from the detents D, the support members 22c can be pivoted via the hinged connection 22d and the support members 22c can be moved to a position lying flat against the lower support members 20 and the mounting plate 16 can be rotated in the direction of arrows A and B as shown and described in FIG. 1B to collapse the apparatus 4.

Figure 1D:
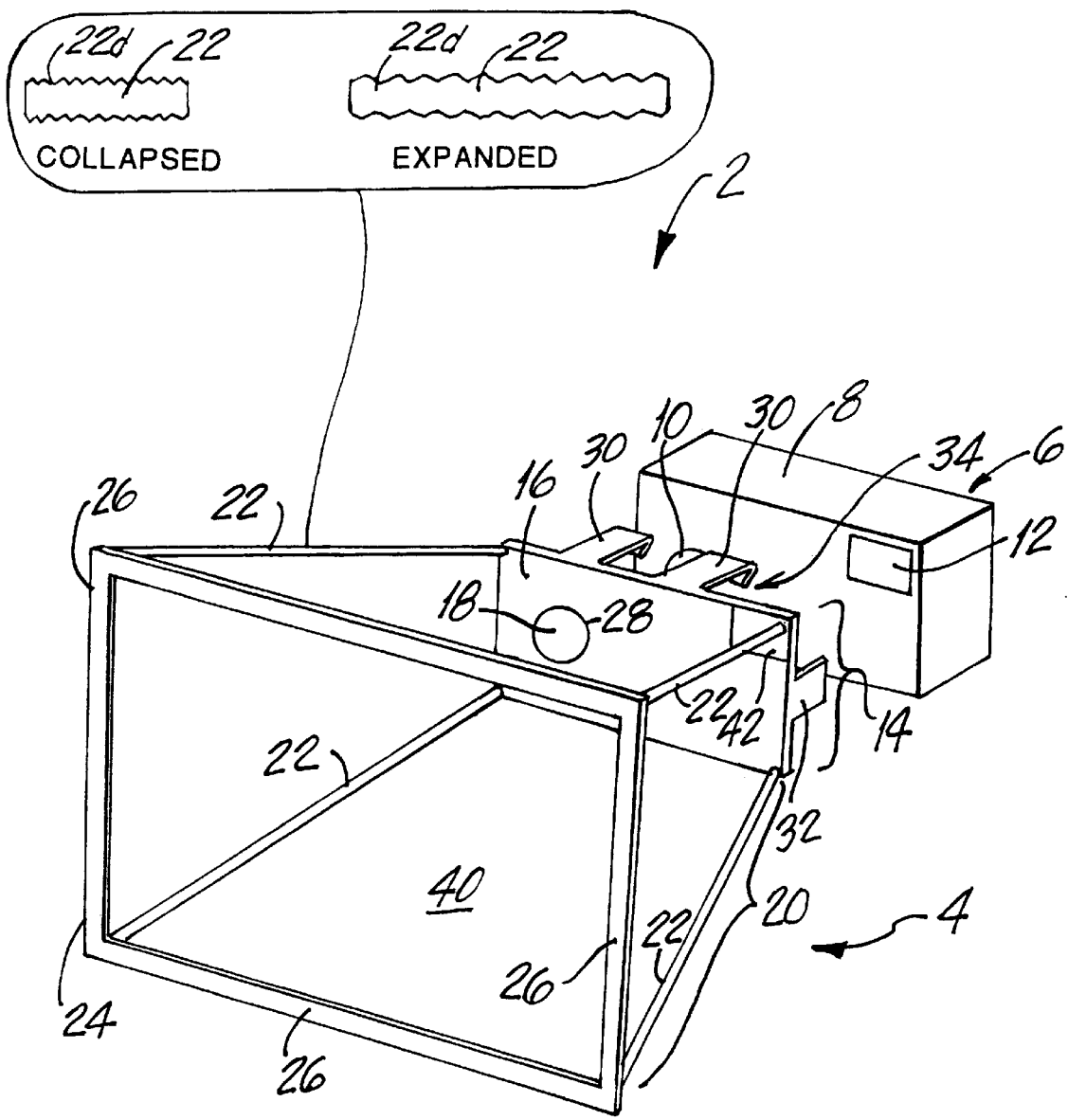

As seen in FIG. 1D, each of the support members 22 is preferably formed to comprise an expandable and collapsible rod, similar to a collapsible straw but made of a much sturdier material. The support members 22 include a plurality of resilient ribs 22d which can be repeatedly moved from the first collapsed position to a second expanded position by applying a pulling force to one of the mounting plate 16 and the base 24 while holding the other of the mounting plate 16 and the base 24 stationary or while pulling the other of the mounting plate 16 and the base 24 in an opposite direction.

The support members 22 can be compressed by applying a compression force against one or both of the mounting plate 16 and the base 24.

Figure 1E:
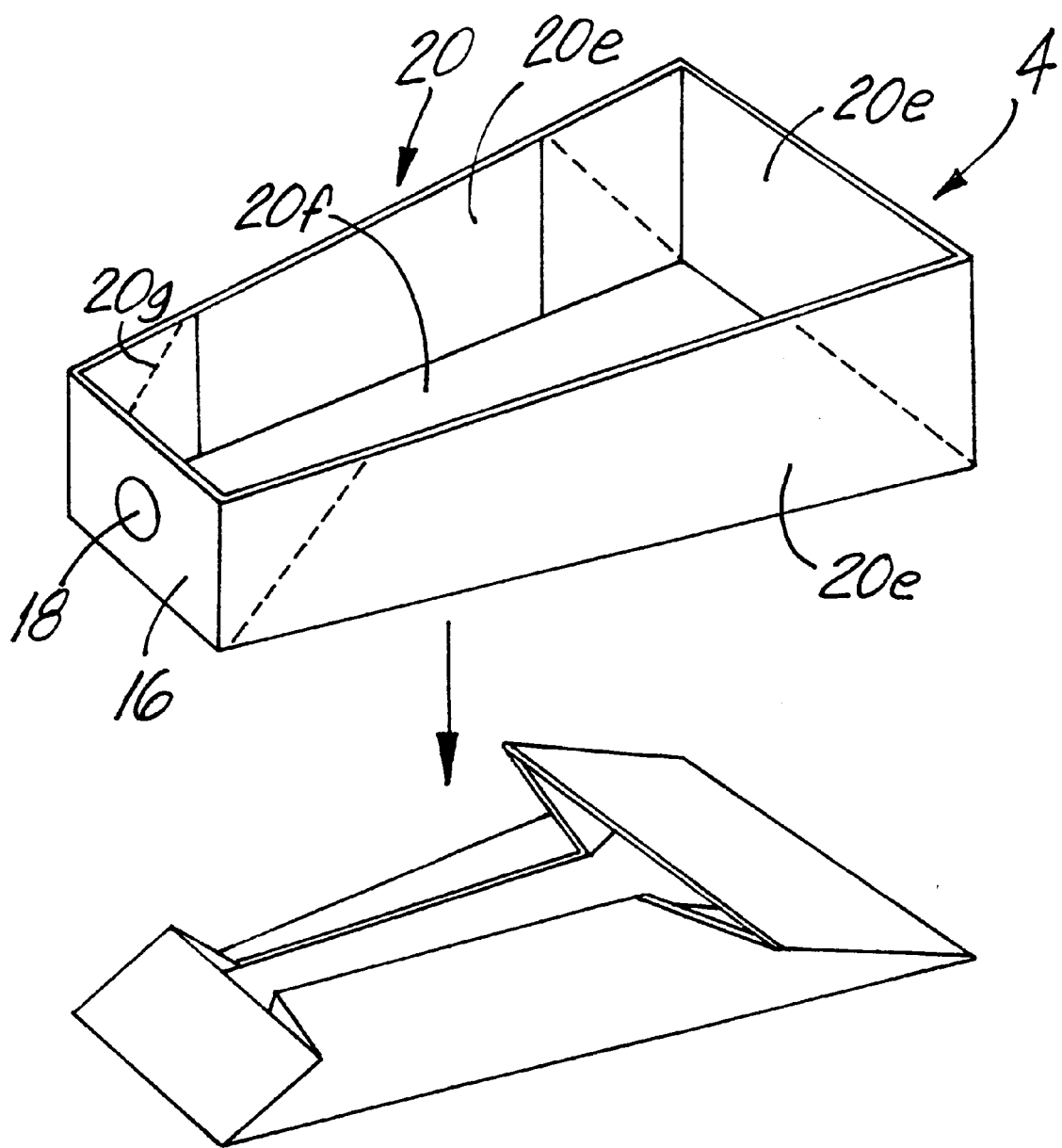

According to FIG. 1E, the frame 20 and the mounting plate 16 are formed as an integral box, preferably formed of plastic or other suitable material. The frame 20 preferably includes an integral unit including side walls 20e and a bottom wall 20f. To provide the collapsing and supporting functions, a plurality of flaps 20g are provided at each corner and can be folded into a supporting position against the side walls 20e or in a non-supporting, collapsed position in which the side walls 20e can be folded along the dotted lines shown in FIG. 1E similar to the folding and unfolding of a department store garment box.

Although not shown in FIG. 1E for clarity of illustration purposes, this preferred embodiment includes flaps 30, 32 as shown in FIGS. 1A–1D for releasably supporting a sterile camera 8.

Figure 1F:
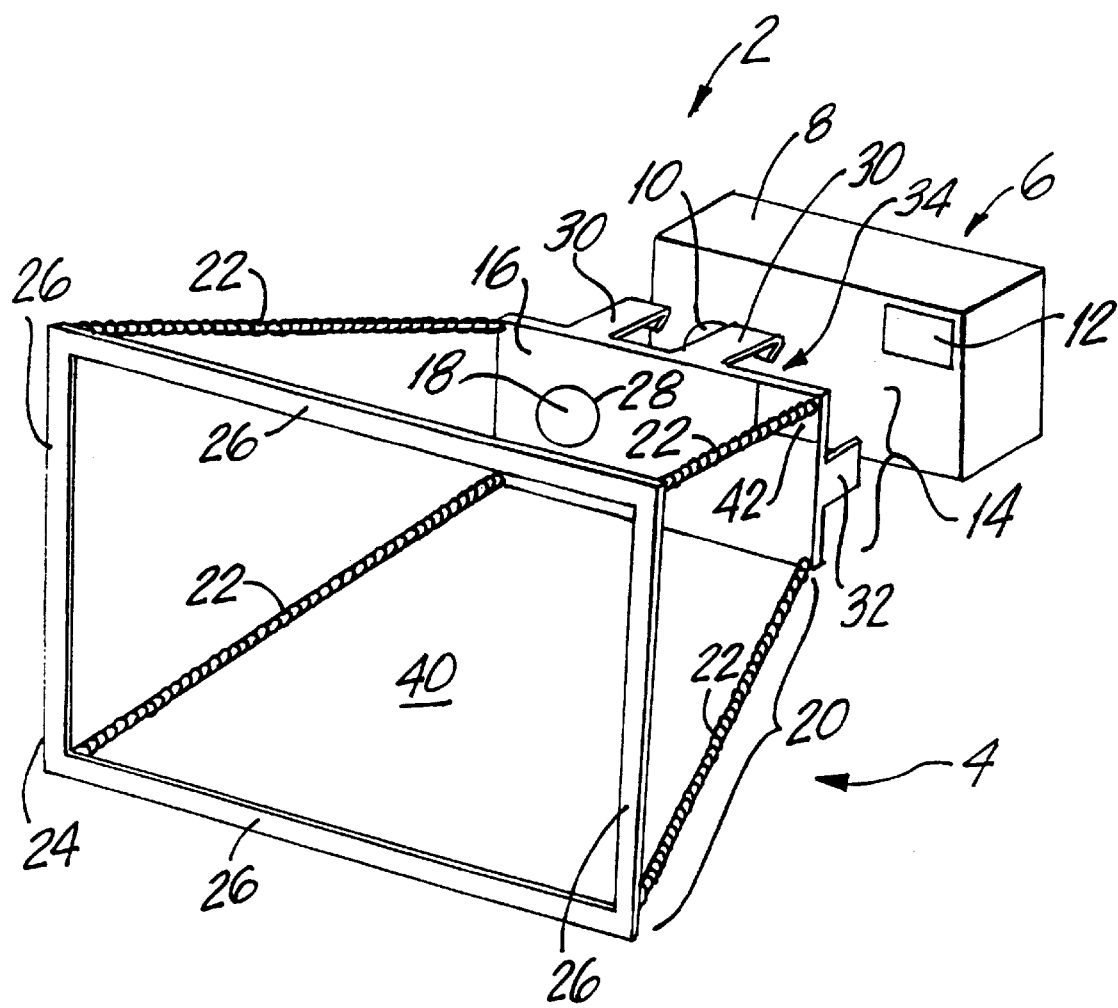

As seen in FIG. 1F, another preferred embodiment includes support members 22 made out of lightweight springs that may be compressed by being deflected sideways to slide into sterilization packaging (not shown) and remain compressed through the sterilization process but when released from packaging have a natural propensity to straighten out and support base members 24, 30 in the image plane regardless of orientation required to capture the appropriate image. Springs 22 are preferably connected via a suitable connection such as being welded to the camera mounting structure and image plane base.

Figure 1G:
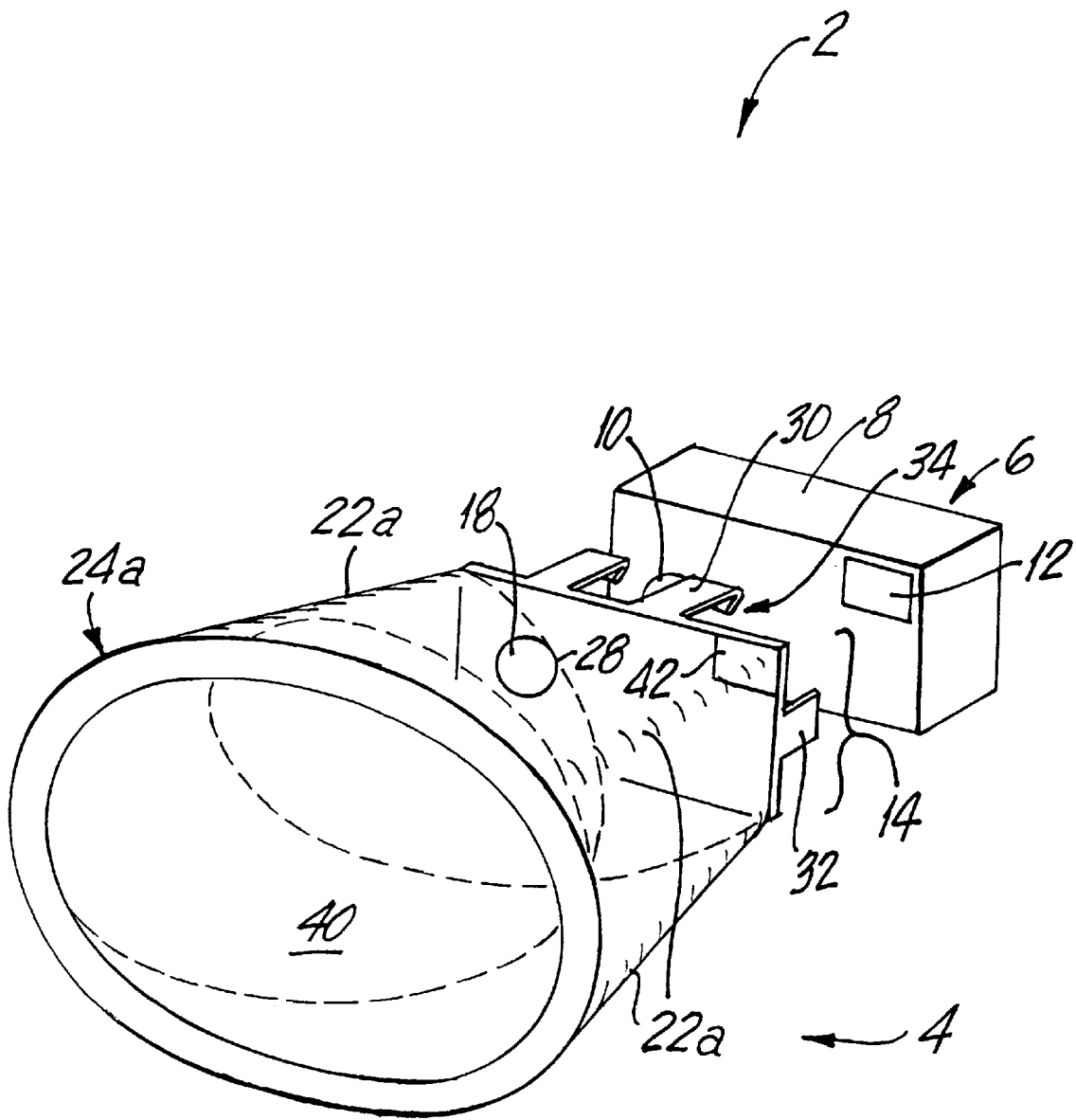

In another preferred embodiment shown in FIG. 1G, a oval image base 24a is connected to the camera mounting structure and image plane base via a tube of sterilizable material (preferably polypropylene) in which large springs 22a are encased. Upon release from its sterile packaging (not shown) the camera apparatus erects itself and supports the base 24a in the image plane regardless of orientation required to capture the appropriate image. In this preferred embodiment, the polypropylene material would preferably be fused into the plastic camera mounting structure and image plane base.

Thus, the structure described above and shown in FIGS. 1B–1G may preferably provide disposable and collapsible features of the preferred embodiments of the present invention which are particularly suited for use in the medical environment. It is therefore understood that according to the preferred embodiments of the present invention, the camera mounting may preferably be arranged to have a collapsible structure which allows the system to occupy minimal space and be easily discarded after use.

Mounting plate 16 is preferably manufactured from an injection-molded engineering plastic or other lightweight material. Frame 20, including structural support members 22 and base members 26, may similarly be manufactured from an injection-molded plastic material which is light in weight and easy to mold but which retains sufficient rigidity to support the weight of camera 6 and withstand the forces imposed during handling of the mounting apparatus.

Because the preferred embodiments of the present invention provide a disposable system, it is preferred if the materials used and the manufacturing processes minimize the cost of the system.

In a preferred embodiment of the present invention, the mounting plate 16, structural supports 22 and base members 26 are all molded together in integral fashion from an optically clear material such as polystyrene, acrylic or a polycarbonate plastic.

Close-up lens 18 can be a discrete lens secured in an aperture 28 formed in mounting plate 16 close-up lens 18 can be a snap-in lens which is adapted to be force-fit in an aperture formed in the mounting plate 16.

Alternately, close-up lens 18 can be formed integrally with mounting plate 16 by suitably adjusting the optical properties of the mounting plate material in the area where lens 18 is to be located, e.g., by adjusting the shape and thickness of the mounting plate material to match the contour of a close-up lens.

The structural support members 22 which link the mounting plate 16 and the base 24 in camera mounting apparatus 4 are of a length which insures that base 24 lies in an image plane 40 at the point of focus of the camera lens 10 acting in conjunction with the close-up lens 18 on the mounting plate 16. Base members 26 are sized to precisely match the field of the image in image plane 40 which is focused on the film in camera 6 by the action of camera lens 10 and close-up lens 18. Thus, when camera 6 is inserted into receiving space 34 and the frame 20 of camera mounting apparatus 4 is placed on an object containing the subject area to be photographed, the subject area is automatically in focus and the image field defined and bordered by the base will automatically coincide with the image field recorded on the film in the camera. All of this is achieved without relying on the camera viewfinder.

If desired, a portion 42 of mounting plate 16 can be formed as a neutral density grey filter to attenuate light from the flash 12 on camera 6 so as to provide proper exposure of the film in the camera. Alternately, a filtering membrane (not shown) can be secured to mounting plate 16 coincident with the flash 12 of camera 6. By suitable adjustment of the light-transmissive properties of the filter portion 42 on the mounting plate, light from the camera flash can be diffused before reaching the image plane 40 of the combined camera lens 10 and close-up lens 18 in order to guarantee proper light exposure of the subject in the image plane when the camera is activated.

In a preferred embodiment of the present invention, camera mounting apparatus 4 is arranged to have a substantially trapezoidal shape seen in FIGS. 1–5. However, as would be immediately apparent to one of ordinary skill in the art, other volumetric shapes could be used for camera mounting apparatus 4 as long as the mounting plate 16 and the base 24 of the camera mounting apparatus remain fixed relative to one another at a distance equal to the point of focus of the close-up lens 18 and camera lens 10 acting in concert. The mounting plate may have any desired diopter close-up lens and suitable shaped frame to achieve a positional relationship such that a base of the frame is spaced at a distance equal to the point of focus of the close-up and camera lenses.

Figure 6:
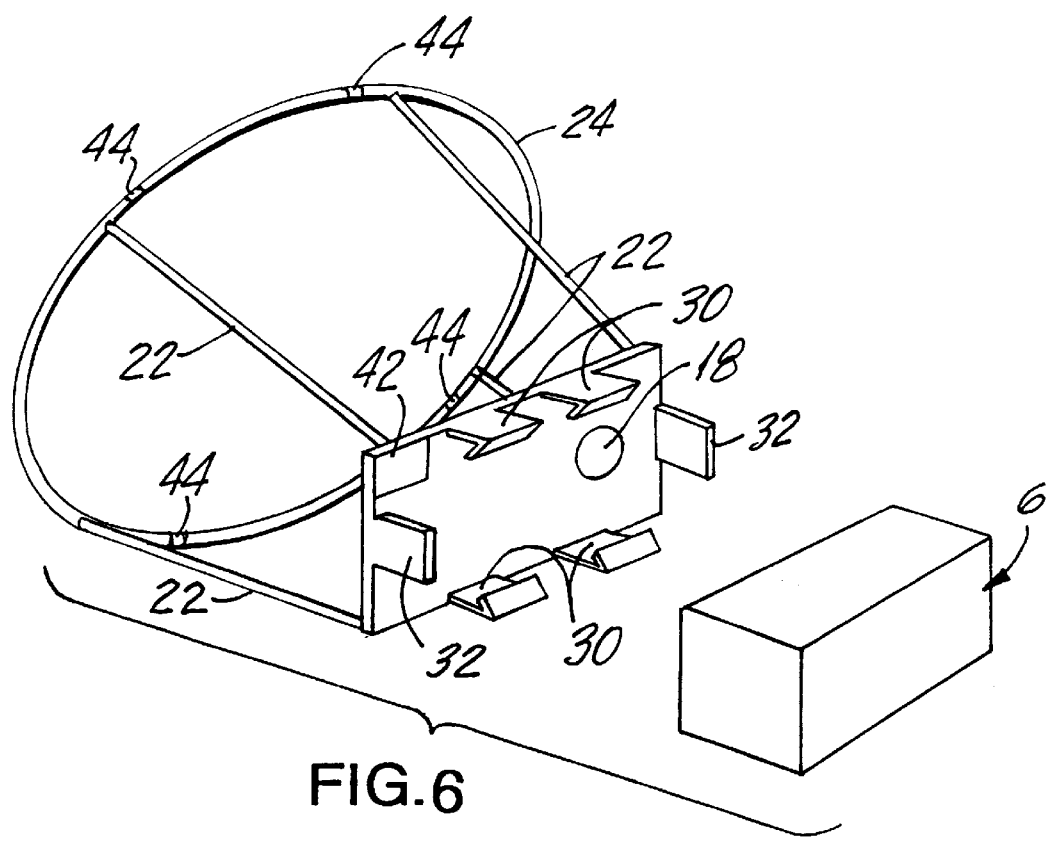
FIG. 6 illustrates an alternate base for the camera mounting apparatus of a preferred embodiment of the present invention.

The shape of base 24 can also be varied as long as the image field of the film in the camera can quickly and accurately be located in relation to the base members. For example, base 24 could be oval-shaped, as seen in FIG. 6, with markers 44 provided on the base to define a periphery of the image field focused on the film in the camera.

Figure 3:
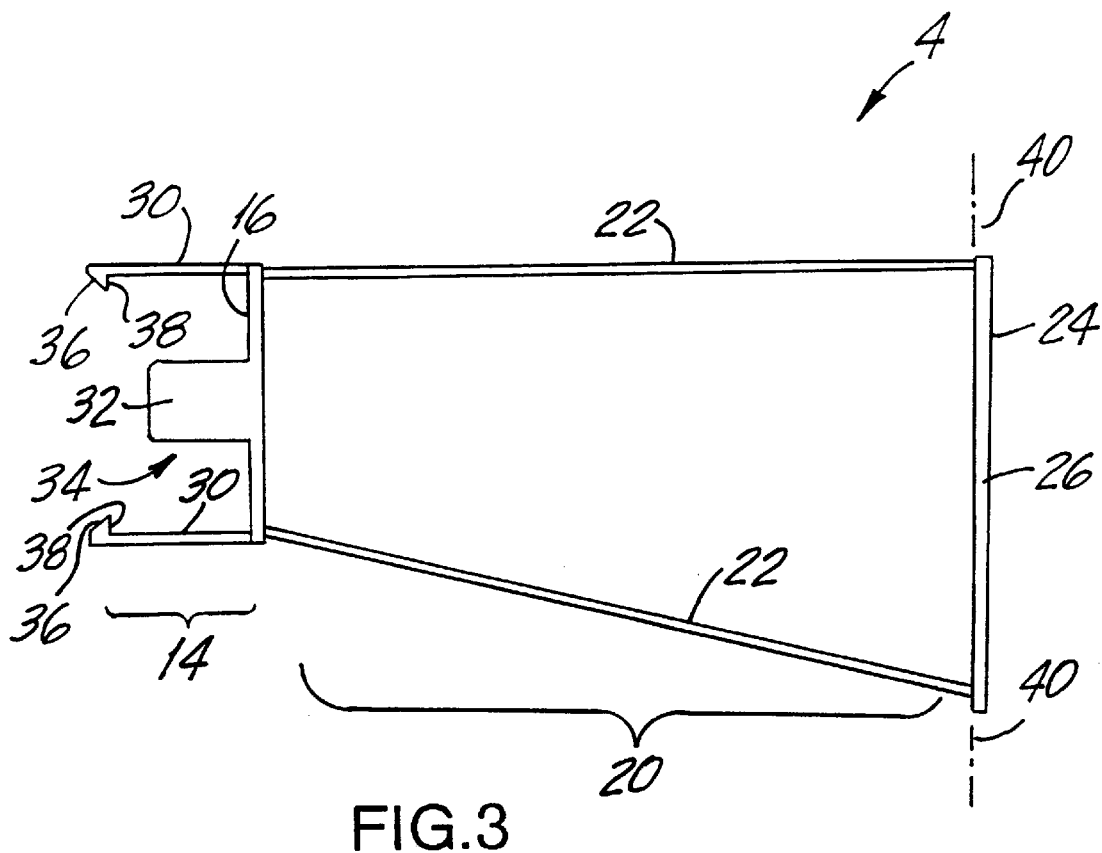
FIG. 3 is a right side view of the camera mounting apparatus shown in FIG. 2.
Figure 2:
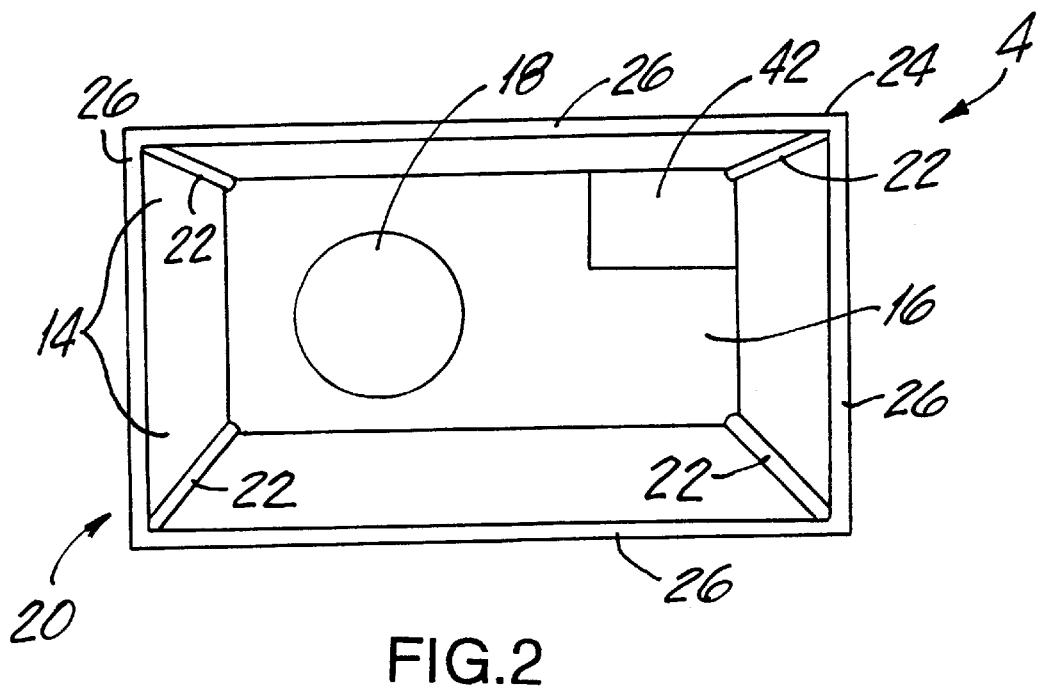
FIG. 2 is a front view of the camera mounting apparatus used with the camera system of a preferred embodiment of the present invention.
Figure 4:
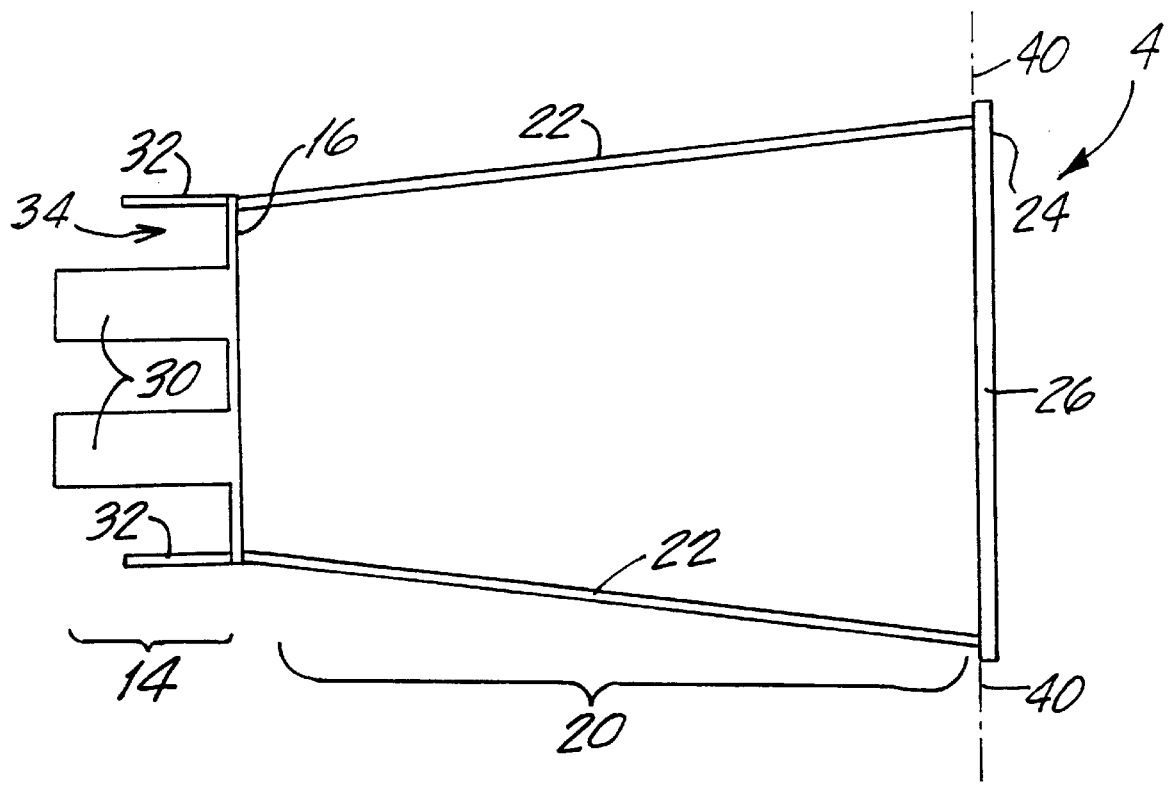
FIG. 4 is a top view of the camera mounting apparatus shown in FIG. 2.
Figure 5:
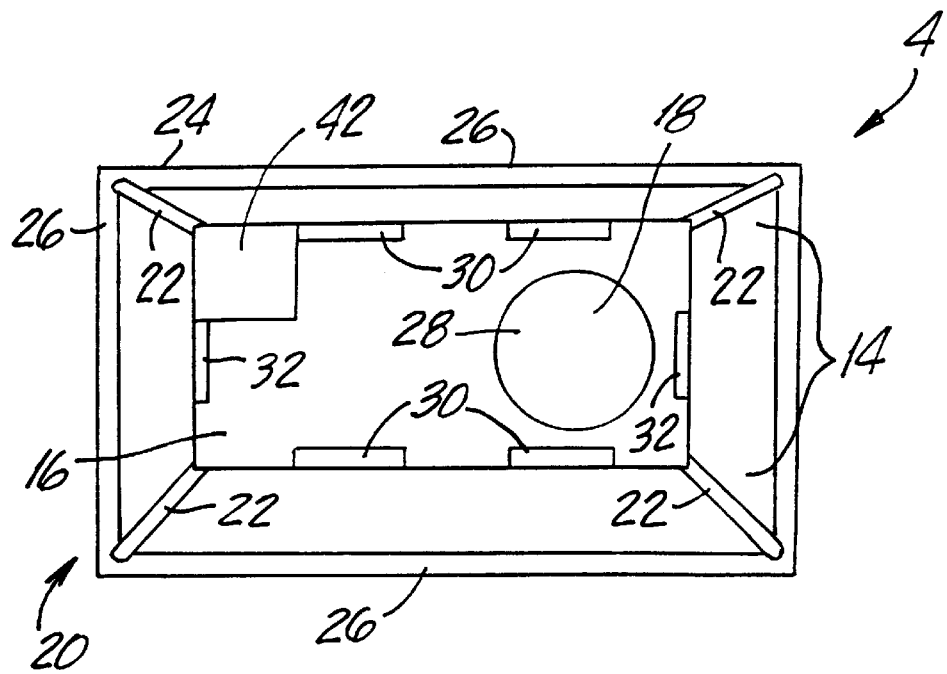
FIG. 5 is a rear view of the camera mounting apparatus shown in FIG. 2.

To provide easy and quick connection and disconnection of the camera or sterile camera unit to the camera mounting apparatus, as seen in FIGS. 3 and 4, mounting plate 16 includes a plurality of mounting members such as flexible snap-tabs 30 and guide tabs 32 arranged around a periphery of the mounting plate periphery. The snap-tabs 30 and guide tabs 32 define a receiving space 34 into which the body 8 of camera 6 may be inserted.

The mounting plate 16 and the camera positioning and holding tabs 30, 32 can be stationary members or alternatively one or more of the tabs 30, 32 may be adjustable to accommodate different size and different type cameras. In a preferred embodiment, the mounting plate 16 is adapted to mount standard size cameras, such as standard size disposable cameras or standard size digital cameras. When it is desired that the apparatus 4 be used with a variety of different cameras during a procedure, the tabs 30, 32 may be adjustable to accommodate many different size and type cameras.

With the resilient structure and positional arrangement of the tabs 30, 32, a camera can be easily and quickly snapped into the opening or cavity 34 and reliably held by tabs 30, 32. The volume of receiving space 34 defined by the arrangement of the tabs 30, 32 and the resiliency of the tabs insures a snug fit between the camera body and the snap-tabs and guide tabs.

In a preferred embodiment, each snap-tab 30 includes a detent 36 with a projection 38 designed to snap over the top of the camera when the camera is inserted on the mounting plate 16. In this manner, the camera body 8 is held firmly in place after the camera has been fully inserted into the receiving space 34 defined by the snap-tabs 30 and guide tabs 32.

Figure 7:
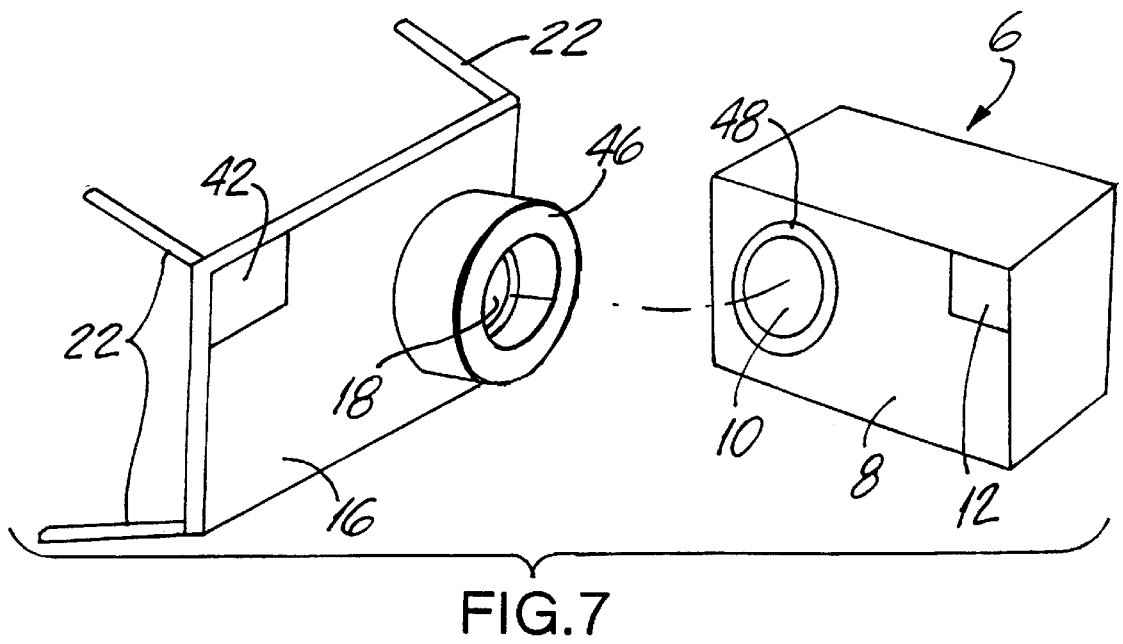
FIG. 7 illustrates an alternate method of releasably securing a camera to the camera mounting apparatus of the preferred embodiment of the present invention.

Turning to FIG. 7, snap-tabs 30 and guide tabs 32 may be replaced with a chuck-type camera mounting member 46 surrounding a close-up lens 18 which is located on a mounting plate 16. Chuck 46 is shaped to define a receiving space with a cross-section matching the cross-section of a raised rim 48 surrounding the camera lens 10 in the body 8 of camera 6. The dimensions of chuck 46 are preferably selected to provide a compression fit between the raised rim 48 and the chuck 46 when the rim 48 is inserted into the receiving space of the chuck 46. In this manner, chuck 46 serves as an alternate structure for releasably securing camera 6 to mounting plate 16 in fixed relation to the close-up lens 18 of the mounting plate. If desired, chuck 46 can be constructed with a gripping or locking mechanism (not shown), e.g., an iris-type mechanism well-known to those of ordinary skill in the art, which can be tightened to further grip rim 48 on the camera body 8 while securing camera 6 in place on the mounting plate.

To achieve the lightweight, durable and collapsible features desired in the preferred embodiments of the present invention, the structural support members 22 and base members 26 of frame 20 are preferably formed of a plastic such as polypropylene or polyethylene. These structural elements 22, 26 may be integrally formed.

But because polypropylene and polyethylene may not exhibit suitable optical properties, it may be desirable in certain preferred embodiments to form the mounting apparatus separately of an appropriate material which has desirable optical characteristics. In that case, mounting plate 16 will preferably be fabricated separately from frame 20, using a different, more optically clear material (such as the aforementioned polystyrene, acrylic or polycarbonate) to allow for the integral provision of close-up lens 18 in the mounting plate. However, if mounting plate 16 in camera mounting structure 14 is fabricated integrally with frame 20, the mounting plate will preferably be equipped with aperture 28 for securing a separate, discrete close-up lens 18.

In another preferred embodiment, the entire mounting plate, whether it is formed as a unitary member with the frame or formed separately, may be made of a plastic material having sufficient neutral grey density so as to function as a filter to attenuate light from the flash 12 on camera 6 so as to provide proper exposure of the film in the camera. In this case, the mounting plate would include an opening for a separately formed lens.

Figure 8:
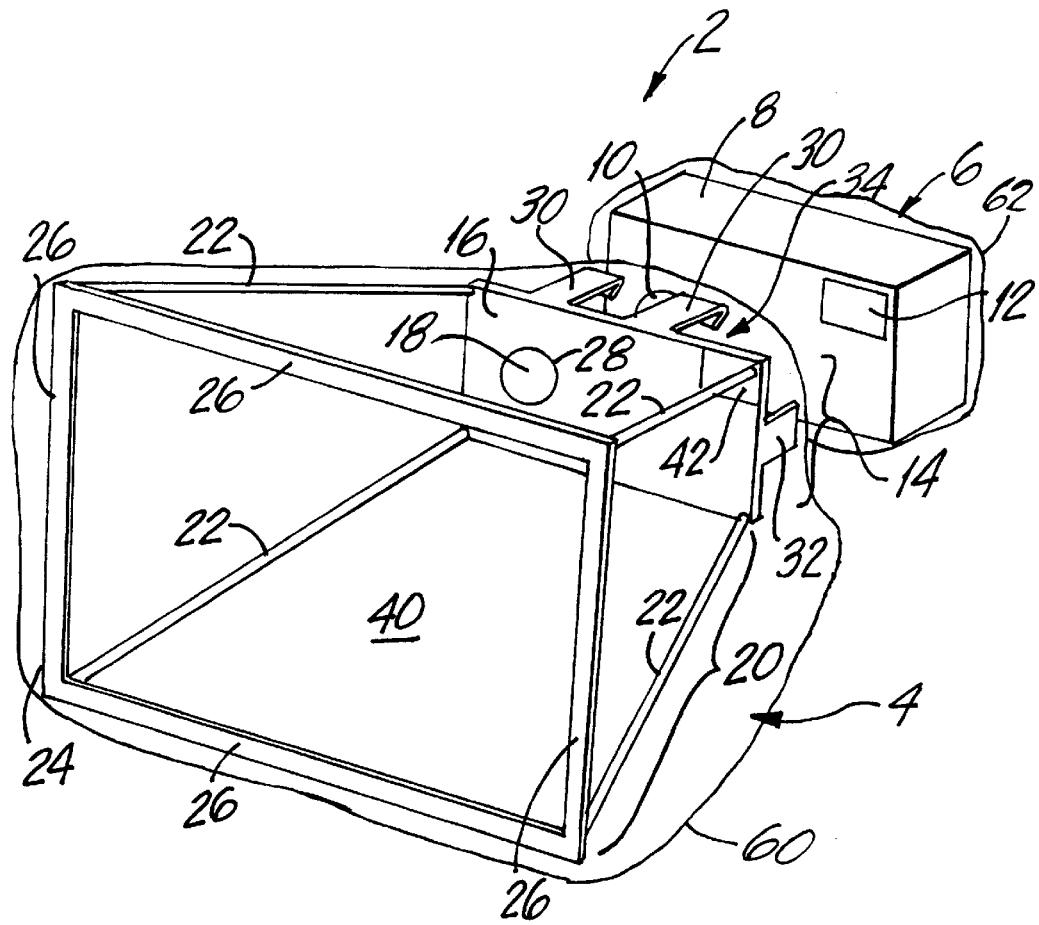
FIG. 8 shows a preferred embodiment of the camera system of the present invention having a sterile packaging.

To achieve the desired sterility, the camera mounting apparatus 4 is preferably sealed in sterile packaging 60 shown in FIG. 8 to achieve a sterile package and enhance its desirability for medical use.

Camera 6 is preferably also disposed in sterile packaging, e.g., a shrink-wrap plastic container 62, to define a sterile camera unit. The shrink-wrap is preferably left in place on camera 6 while the camera is inserted into the receiving space 34 defined by snap-tabs 30 and guide tabs 32 on mounting plate 16 of the camera mounting structure 14. Due to the tight-fitting nature of shrink-wrap material, the image reaching the camera lens 10 through close-up lens 18 in mounting plate 16 suffers little or no distortion. After the subject area of interest bordered by the base 24 of frame 20 has been photographed and the desired number of exposures collected, camera mounting apparatus 4 is preferably discarded. Camera 6, still inside the shrink-wrap container 62, can then be placed into a sterile uncontaminated zip-lock bag supplied with the system (not shown) or other suitable sterile package supplied with the camera system, thus providing protection against contamination of workers handling the camera. The camera, after being placed in the sterile uncontaminated zip-lock bag can then be sent to a film developing laboratory for processing and development. The uncontaminated zip-lock bag is opened at the film developing laboratory, the contaminated camera removed from the zip-lock bag, the shrink-wrap film slit open and removed from the camera and finally, the photographic film removed from the camera for processing. Thereafter, the camera itself can be disposed of in a manner consistent with other disposable camera bodies.

According to a preferred embodiment of the present invention, the camera and frame are preferably sterilized and then provided in a double-wrap sterile packaging which maintains the sterile environment of the camera mounting apparatus. More particularly, the camera, preferably a disposable camera, is wrapped in a shrink wrap material which preferably remains on the camera even during use. Then, the camera and the frame are provided in a container, such as a box. The box is preferably wrapped in a material such as paper or other suitable material that is gas permeable. Then, the wrapped container having the camera and frame disposed therein are sterilized via an autoclave or similar device using ethylene oxide or other suitable material. A second wrap is provided on the outside of the wrapped container before it is sterilized to form the sterilized packaging materials. The entire apparatus is preferably stored and shipped in this sterile packaging.

In an alternative embodiment where a camera other than a disposable camera is used, the frame can be provided in one sterile packaging and the camera can be provided in another sterile packaging.

Figure 9:
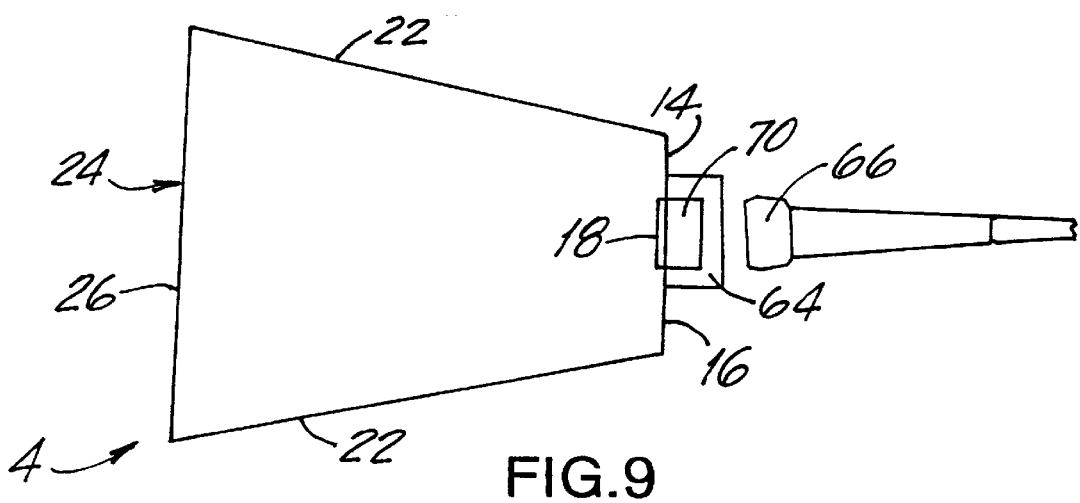
FIG. 9 is a view of yet another preferred embodiment of the present invention, adapted for use with an arthroscopic video camera.

In yet another preferred embodiment of the present invention, shown in FIG. 9, mounting plate 16 of camera mounting structure 14 is formed with an adaptor ring 64 over close-up lens 18. Adaptor ring 64 is designed to receive the mounting ring 66 of an arthroscopic or endoscopic camera 68. An adaptor lens 70 with correct diopter is secured in adaptor ring 64. Close-up television images can subsequently be generated with the arthroscopic camera, focused on the area within the base 24 of the camera mounting apparatus. Hard copies of the images can also be generated with a standard printer device (not shown) in the arthroscopic equipment rack associated with the arthroscopic camera.

Figure 10:
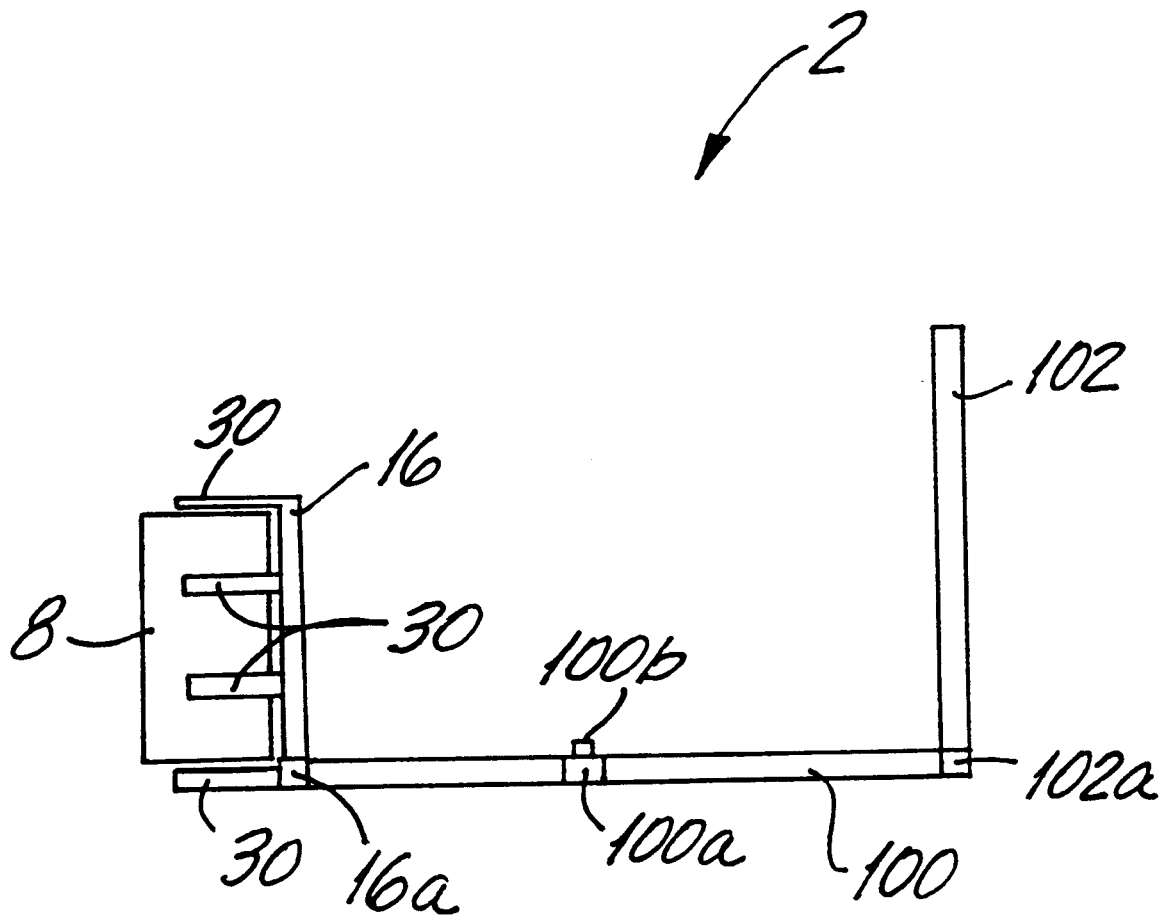
FIG. 10 shows another preferred embodiment of the present invention including a rod connecting a camera mounting plate and a base plate.

In a further embodiment shown in FIG. 10, another camera mounting system 2 is shown to include a camera 8, a camera mounting plate 16 including tabs 30 for releasably holding the camera 8 in place. The system 2 of FIG. 10 includes a rod 100 and base plate 102 which is connected to the mounting plate 16 via the rod 100.

It should be noted that each of the structural components of the system 2 shown in FIG. 10 are constructed to be disposable and made of similar material as the components of the other preferred embodiments described above. In addition, the components are sterile and include sterile packaging similar to that shown in FIG. 8. Thus, the system 2 is also sterile and disposable as with the other preferred embodiments.

The rod 100 may comprise a single member or may comprise two members being constructed in a telescoping arrangement relative to each other such that the distance between the camera mounting plate 16 and the base plate 102 can be altered as desired to change a focal length. If such a telescoping arrangement is used, a telescoping mating portion 100a includes a locking member 100b to releasably lock the two members comprising the rod 100 in a fixed position relative to each other.

The rod 100 is connected at a first end by being releasably inserted into an opening 102a formed in the base plate 102. The rod 100 is connected at a second end by being releasably inserted into an opening 16a formed in the camera mounting plate 16. In this manner, the system 2 can be quickly and easily assembled and disassembled. As a result, the system components can be stored in a disassembled state and then quickly assembled for use. After use, the system components 102, 100, 16 can be disassembled and discarded as waste.

Alternatively, the rod 100 may be connected at the first and second ends to the base plate 102 and the mounting plate 16, respectively, via hinges at each end. The hinges would be located in the same position and would replace the openings 102a and 16a. In this preferred embodiment, instead of disassembling the components, the base plate 102 and the mounting plate 16 could be rotated via hinges 102a, 16a to a collapsed position for storage and later disposal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for mounting a camera over a subject to be photographed, the camera containing a camera lens, said apparatus comprising:
   a mounting structure which is sterile and adapted to receive the camera, said mounting structure having a shape defining a receiving space which releasably holds at least a portion of the camera when said mounting structure receives the camera, said mounting structure including a close-up lens which aligns with the lens of the camera when the camera is received by said mounting structure;
   a frame which is sterile and supports said mounting structure, said frame including a base positioned from said close-up lens of said mounting structure at a distance which is equal to the point of focus of the camera lens acting in combination with said close-up lens wherein said frame is coupled to the base by a rod that comprises two members constructed in a telescoping arrangement relative to each other such that said frame can extend from a collapsed position to a non-collapsed position;
   a container holding the sterile mounting structure, the frame and the camera; a first sterile wrap material covering said container holding the mounting structure, the frame and the camera; and
   a second sterile wrap material covering said first sterile wrap material covering said container.

2. An apparatus as set forth in claim 1, wherein said mounting structure includes at least one mounting member shaped to define said receiving space which releasably holds at least said portion of the camera when the camera is received by said mounting structure.

3. An apparatus as set forth in claim 2, wherein said mounting structure includes a mounting plate and a plurality of mounting members shaped in an arrangement to define said receiving space which holds at least said portion of said camera.

4. An apparatus as set forth in claim 3, wherein the camera includes a camera body and said plurality of mounting members include snap-tabs which releasably hold the camera body when the camera is inserted into said receiving space defined by said mounting members.

5. An apparatus as set forth in claim 4, wherein said plurality of mounting members further include guide tabs which together with said snap-tabs define said receiving space.

6. An apparatus as set forth in claim 2, wherein the camera includes a rim surrounding the camera lens and said mounting structure includes a mounting member shaped to define said receiving space such that said receiving space fits around the rim of the camera.

7. An apparatus as set forth in claim 6, wherein said mounting member shaped to define said receiving space has a cross-section which is dimensioned to provide a compression fit between the rim of the camera and said mounting member.

8. An apparatus as set forth in claim 7, wherein said mounting member includes a gripping mechanism which grips the rim of the camera when the camera is received by said mounting structure.

9. An apparatus as set forth in claim 2, wherein the camera is an arthroscopic camera and said mounting member of said mounting structure is shaped to releasably receive the arthroscopic camera.

10. An apparatus as set forth in claim 1, wherein said base of said frame defines an image area at said point of focus of the camera lens acting in combination with said close-up lens.

11. An apparatus as set forth in claim 10, wherein said image area defined by said base is a planar image area which coincides with the image field of the camera lens in the camera.

12. An apparatus as set forth in claim 1, wherein said frame further includes structural members which secure said base to said mounting structure.

13. An apparatus as set forth in claim 12, wherein said structural members are collapsible such that said frame can extend from a collapsed position to a non-collapsed position.

14. An apparatus as set forth in claim 13, wherein said frame further includes members which secure said collapsible structural members in a rigid fashion when said frame is extended to its non-collapsed position.

15. An apparatus as set forth in claim 1, further including packaging material which encloses said apparatus.

16. An apparatus as set forth in claim 15, wherein said packaging material is sterile packaging material which encloses the apparatus in a sterile environment.

17. A camera system for taking close-up photographs of subjects which are automatically in focus, said camera system comprising:
- a camera being sterile and including a camera body and a camera lens disposed in said camera body;
- a first sterile wrap material covering said camera;
- a camera mounting apparatus being sterile and including a mounting structure adapted to receive said camera, said mounting structure having a shape defining a receiving space which releasably holds at least a portion of said camera body when said mounting structure receives said camera, said mounting structure including a close-up lens which aligns with said camera lens when said camera is received by said mounting structure;
    - said camera mounting apparatus also including a frame which supports said mounting structure, said frame including a base positioned from said close-up lens of said mounting structure at a distance which is equal to the point of focus of said camera lens acting in combination with said close-up lens wherein said frame includes a base connected to the mounting structure via a rod that comprises two members constructed in a telescoping arrangement relative to each other such that said frame can extend from a collapsed position to a non-collapsed position;
- a container holding the sterile camera covered by said first wrap material, the mounting structure, and the frame;
- a second sterile wrap material covering said container holding the mounting structure, the frame, and the camera; and
- a third sterile wrap material covering said second sterile wrap material covering said container.

18. A camera system as set forth in claim 17, wherein said mounting structure of said camera mounting apparatus includes at least one mounting member shaped to define said receiving space which releasably holds at least said portion of said camera body when said camera is received by said mounting structure.

19. A camera system as set forth in claim 18, wherein said mounting structure includes a mounting plate and a plurality of mounting members shaped in an arrangement to define said receiving space which releasably holds at least said portion of said camera.

20. A camera system as set forth in claim 19, wherein said plurality of mounting members include snap-tabs which releasably hold said camera body when said camera is inserted into said receiving space defined by said mounting members.

21. A camera system as set forth in claim 20, wherein said plurality of mounting members further include guide tabs which together with said snap-tabs define said receiving space.

22. A camera system as set forth in claim 18, wherein said camera includes a rim surrounding said camera lens on said camera body and said mounting structure of said camera mounting apparatus includes a mounting member shaped to define said receiving space such that said receiving space fits around said rim of said camera.

23. A camera system as set forth in claim 22, wherein said mounting member shaped to define said receiving space has a cross-section which is dimensioned to provide a compression fit between said rim of said camera and said mounting member.

24. A camera system as set forth in claim 23, wherein said mounting member includes a gripping mechanism which grips said rim of said camera when said camera is received by said mounting structure.

25. A camera system as set forth in claim 17, wherein said base of said frame defines an image area at said point of focus of said camera lens acting in combination with said close-up lens.

26. A camera system as set forth in claim 25, wherein said image area defined by said base is a planar image area which coincides with the image field of said camera lens in said camera.

27. A camera system as set forth in claim 17, wherein said frame further includes members which secure said collapsible structural members in a rigid fashion when said frame is extended to its non-collapsed position.

28. A camera system as set forth in claim 17, wherein said second and third sterile wrap materials include a shrink-wrap container which surrounds said camera.

29. An apparatus for mounting a camera over a subject to be photographed, the camera containing a camera lens, said apparatus comprising:
- a mounting structure which is sterile and adapted to receive the camera, said mounting structure having a shape defining a receiving space which releasably holds at least a portion of the camera when said mounting structure receives the camera, said mounting structure including a close-up lens which aligns with the lens of the camera when the camera is received by said mounting structure;
- a frame which is sterile and supports said mounting structure, said frame including a base positioned from said close-up lens of said mounting structure at a distance which is equal to the point of focus of the camera lens acting in combination with said close-up lens wherein said frame includes structural members which secure said base to said mounting structure and said structural members are collapsible such that said frame can extend from a collapsed position to a non-collapsed position and wherein the frame and a mounting plate for attaching the frame to the camera form a collapsible box wherein one of:
    - a plurality of flaps are provided at each corner and are selectably foldable into a supporting non-collapsed/ non-supporting collapsed position against the side walls; or
    - a plurality of support members hingedly connected to said frame and said mounting structure which are detachably attached to a plurality of detents on said structural members to collapse the frame into one plane or maintain the frame in a non-collapsed position;
- a container holding the sterile mounting structure, the frame and the camera; a first sterile wrap material covering said container holding the mounting structure, the frame and the camera; and
- a second sterile wrap material covering said first sterile wrap material covering said container.

30. A camera system for taking close-up photographs of subjects which are automatically in focus, said camera system comprising:
- a camera being sterile and including a camera body and a camera lens disposed in said camera body;
- a first sterile wrap material covering said camera;
- a camera mounting apparatus being sterile and including a mounting structure adapted to receive said camera, said mounting structure having a shape defining a receiving space which releasably holds at least a portion of said camera body when said mounting structure receives said camera, said mounting structure including a close-up lens which aligns with said camera lens when said camera is received by said mounting structure;

said camera mounting apparatus also including a frame which supports said mounting structure, said frame including a base positioned from said close-up lens of said mounting structure at a distance which is equal to the point of focus of said camera lens acting in combination with said close-up lens wherein said frame includes structural members which secure said base to said mounting structure and said structural members are collapsible such that said frame can extend from a collapsed position to a non-collapsed position and wherein the frame and a mounting plate for attaching the frame to the camera form a collapsible box wherein one of:

a plurality of flaps are provided at each corner and are selectably foldable into a supporting non-collapsed/non-supporting collapsed position against the side walls; or a plurality of support members hingedly connected to said frame and said mounting structure which are detachably attached to a plurality of detents on said structural members to collapse the frame into one plane or maintain the frame in a non-collapsed position;

a container holding the sterile camera covered by said first wrap material, the mounting structure, and the frame;

a second sterile wrap material covering said container holding the mounting structure, the frame, and the camera; and a third sterile wrap material covering said second sterile wrap material covering said container.

* * * * *